US012353920B2

(12) United States Patent
Voruganti et al.

(10) Patent No.: US 12,353,920 B2
(45) Date of Patent: Jul. 8, 2025

(54) DISTRIBUTED ARTIFICIAL INTELLIGENCE FABRIC CONTROLLER

(71) Applicant: Equinix, Inc., Redwood City, CA (US)

(72) Inventors: Kaladhar Voruganti, San Jose, CA (US); Danjue Li, Dublin, CA (US); Lanfa Wang, Sunnyvale, CA (US); Mustafa Arisoylu, San Jose, CA (US); Ravi Kiran Pasula, San Jose, CA (US); Rodney Martin Elder, Plainfield, IL (US); Zoe Liu, Chino Hills, CA (US)

(73) Assignee: Equinix, Inc., Redwood City, CA (US)

( * ) Notice: Subject to any disclaimer, the term of this patent is extended or adjusted under 35 U.S.C. 154(b) by 699 days.

(21) Appl. No.: 17/644,961

(22) Filed: Dec. 17, 2021

(65) Prior Publication Data

US 2022/0206865 A1   Jun. 30, 2022

Related U.S. Application Data

(60) Provisional application No. 63/131,695, filed on Dec. 29, 2020.

(51) Int. Cl.
*G06F 9/50* (2006.01)
*G06F 11/30* (2006.01)
(Continued)

(52) U.S. Cl.
CPC .......... *G06F 9/5055* (2013.01); *G06F 9/5072* (2013.01); *G06F 9/5077* (2013.01);
(Continued)

(58) Field of Classification Search
CPC .... G06F 9/5055; G06F 9/5072; G06F 9/5077; G06F 11/3006; G06F 11/3409; G06F 2209/508; G06N 20/00
See application file for complete search history.

(56) References Cited

U.S. PATENT DOCUMENTS

| 9,886,267 | B2 | 2/2018 | Maheshwari et al. |
| 9,948,552 | B2 | 4/2018 | Teng et al. |

(Continued)

FOREIGN PATENT DOCUMENTS

| EP | 3382544 A1 | 10/2018 |
| WO | 2020226979 A2 | 11/2020 |

OTHER PUBLICATIONS

"Documentation, Kube Flow," www.kubeflow.org/docs/, last modified Apr. 21, 2020, 1 pp.

(Continued)

*Primary Examiner* — Jorge A Chu Joy-Davila
(74) *Attorney, Agent, or Firm* — Shumaker & Sieffert, P.A.

(57) ABSTRACT

In general, this disclosure describes techniques for configuring and provisioning, with a distributed artificial intelligence (AI) fabric controller, network resources in an AI fabric for use by AI applications. In one example, the AI fabric controller is configured to discover available resources communicatively coupled to a cloud exchange; obtain a set of candidate solutions, each candidate solution of the set of candidate solutions comprising an AI application and a configuration of resources for use by the AI application; filter, based on one or more execution metrics corresponding to each of the candidate solutions, the set of candidate solutions to generate a filtered set of candidate solutions; generate provisioning scripts for the filtered set of candidate solutions; execute the provisioning scripts to provision resources for each candidate solution in the filtered set of candidate solutions; and create an execution environment for each candidate solution in the filtered set of candidate solutions.

20 Claims, 9 Drawing Sheets

(51) Int. Cl.
*G06F 11/34* (2006.01)
*G06N 20/00* (2019.01)

(52) U.S. Cl.
CPC ...... *G06F 11/3006* (2013.01); *G06F 11/3409* (2013.01); *G06N 20/00* (2019.01); *G06F 2209/508* (2013.01)

(56) References Cited

U.S. PATENT DOCUMENTS

| | | | |
|---|---|---|---|
| 10,129,078 B2 | 11/2018 | Kumar et al. | |
| 10,735,281 B1* | 8/2020 | Burgin | H04L 67/10 |
| 11,074,107 B1* | 7/2021 | Nandakumar | G06F 8/10 |
| 2013/0138806 A1* | 5/2013 | Gohad | G06F 9/5072 |
| | | | 709/224 |
| 2017/0149875 A1* | 5/2017 | Iyengar | H04L 41/5051 |
| 2017/0180220 A1* | 6/2017 | Leckey | H04L 41/122 |
| 2017/0187791 A1* | 6/2017 | Bayon-Molino | H04L 41/0806 |
| 2017/0277531 A1* | 9/2017 | McGrath | G06F 11/36 |
| 2020/0136906 A1 | 4/2020 | Guim Bernat et al. | |
| 2020/0195607 A1 | 6/2020 | Wang et al. | |

OTHER PUBLICATIONS

International Search Report and Written Opinion of International Application No. PCT/US2021/064136, mailed Mar. 18, 2022, 11 pp.

Response to Communication Pursuant to Rules 161(1) and 162 EPC dated Aug. 8, 2023, from counterpart European Application No. 21844858.7, filed Feb. 6, 2024, 10 pp.

Response to Office Action dated Oct. 9, 2023, from counterpart Australian Application No. 2021413737 filed Jan. 5, 2024, 15 pp.

Notice of Intent to Grant from counterpart Australian Application No. 2021413737 dated Jan. 30, 2024, 7 pp.

First Examination Report from counterpart Australian Application No. 2021413737 dated Oct. 9, 2023, 3 pp.

International Preliminary Report on Patentability from International Application No. PCT/US2021/064136 dated Jul. 13, 2023, 9 pp.

\* cited by examiner

DISTRIBUTED ARTIFICIAL INTELLIGENCE FABRIC CONTROLLER

This application claims the benefit of U.S. Provisional Patent Application No. 63/131,695, filed 29 Dec. 2020, the entire contents of which is incorporated herein by reference.

TECHNICAL FIELD

The disclosure relates to computer networks and, more specifically, to controlling an artificial intelligence fabric in computer networks.

BACKGROUND

Cloud computing refers to the use of dynamically scalable computing resources accessible via a network, such as the Internet. The computing resources, often referred to as a "cloud," can be used for data storage and to provide services to users. These services may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Artificial Intelligence (AI) services are now being provided via cloud architectures. For example, training data can be provided from cloud storage systems and used to train a machine learning model. Further, partially or fully trained machine learning models can be provided from cloud storage systems. Moreover, training algorithms can be stored and performed by cloud-based service providers.

SUMMARY

In general, this disclosure describes techniques for configuring and provisioning, with a distributed AI fabric controller, network resources in an AI fabric for use by AI applications. Currently, many AI applications are centralized in that AI model training, and inferencing takes place in the same location. However, it can be desirable to move training and inferencing closer to the edge where data is generated in order to improve response times. Thus, AI applications are moving from a centralized to a distributed model in which training and inference operations are moving closer toward the device edge for performance, cost, and privacy reasons. However, there can be many other factors that affect where training and inferencing operations take place. For example, data sets used in AI applications may be spread across clouds, private data centers, and data brokers that may be in multiple geographic locations. Further, there can be various choices for AI hardware from different clouds and vendors. Additionally, utilization and performance of these resources may vary over time. AI application administrators may need to choose whether to use a centralized (where data moves to compute resources) or a federated (where compute resources move to data) AI training approach by jointly considering model accuracy, privacy and infrastructure cost and performance. In view of the above, there may be an overwhelming number of possible combinations of network resources, compute resources, and AI application locations to consider when attempting to optimize AI application performance.

An AI fabric controller can discover available network and compute resources, analyze AI application performance using various combinations of the available resources, and determine an appropriate combination of resources and AI application location to optimize AI application performance. The AI fabric controller can also monitor available and newly discovered resources and update AI application placement and resource usage if such updates can improve AI application performance or provide sufficient AI application performance at a lower cost.

The aspects described above, and further aspects described herein may provide one or more technical advantages that present at least one practical application. For example, an AI fabric controller can use the techniques described herein to provide recommendations on the optimum sites for executing distributed AI training and inference workloads across a network fabric of interconnected sites and can inform the provisioning of any needed underlay infrastructure resources. As another example, the AI fabric controller can use the techniques described herein to concurrently try different AI model training configurations to determine which configuration provides a desirable combination of performance, model accuracy, cost, and privacy. The AI fabric controller can determine where to provision AI training and inference workloads across a network fabric that interconnects data sources, multiple AI training locations, and multiple AI inference locations across public clouds and metro edges. Further, the techniques described herein can provide an AI fabric control layer interface to AI PaaS layers from various AI solution providers thereby making it easy for solution providers to deploy distributed AI solutions.

In one example, this disclosure describes a computing device that includes processing circuitry coupled to a memory; an artificial intelligence (AI) fabric controller configured for execution by the processing circuitry, wherein the AI fabric controller comprises: a monitoring service configured to discover available resources communicatively coupled to a cloud exchange and to monitor the available resources; an analysis service configured to: obtain a set of candidate solutions, each candidate solution of the set of candidate solutions comprising an AI application and a configuration of resources for use by the AI application, wherein the configuration of resources is different for each of the candidate solutions, and wherein each of the candidate solutions is associated with corresponding execution metrics, and filter, based on one or more of the corresponding execution metrics, the set of candidate solutions to generate a filtered set of candidate solutions; a planning service configured to generate provisioning scripts for the filtered set of candidate solutions; and an execution service configured to execute the provisioning scripts to provision resources for each candidate solution in the filtered set of candidate solutions and to create an execution environment for each candidate solution in the filtered set of candidate solutions.

In another example, this disclosure describes a method that includes discovering, by one or more processors, available resources communicatively coupled to a cloud exchange; obtaining, by the one or more processors, a set of candidate solutions, each candidate solution of the set of candidate solutions comprising an AI application and a configuration of resources for use by the AI application, wherein the configuration of resources is different for each of the candidate solutions, and wherein each of the candidate solutions is associated with corresponding execution metrics, and filtering, by the one or more processors, based on one or more of the corresponding execution metrics, the set of candidate solutions to generate a filtered set of candidate solutions; generating, by the one or more processors, provisioning scripts for the filtered set of candidate solutions; executing, by the one or more processors, the provisioning scripts to provision resources for each candidate solution in the filtered set of candidate solutions; and creating an execution environment for each candidate solution in the filtered set of candidate solutions.

In another example, this disclosure describes a non-transitory computer readable medium comprising instructions that, when executed by one or more processors, cause the one or more processors to: discover available resources communicatively coupled to a cloud exchange; obtain a set of candidate solutions, each candidate solution of the set of candidate solutions comprising an AI application and a configuration of resources for use by the AI application, wherein the configuration of resources is different for each of the candidate solutions, and wherein each of the candidate solutions is associated with corresponding execution metrics, and filter, based on one or more of the corresponding execution metrics, the set of candidate solutions to generate a filtered set of candidate solutions; generate provisioning scripts for the filtered set of candidate solutions; execute the provisioning scripts to provision resources for each candidate solution in the filtered set of candidate solutions; and create an execution environment for each candidate solution in the filtered set of candidate solutions.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
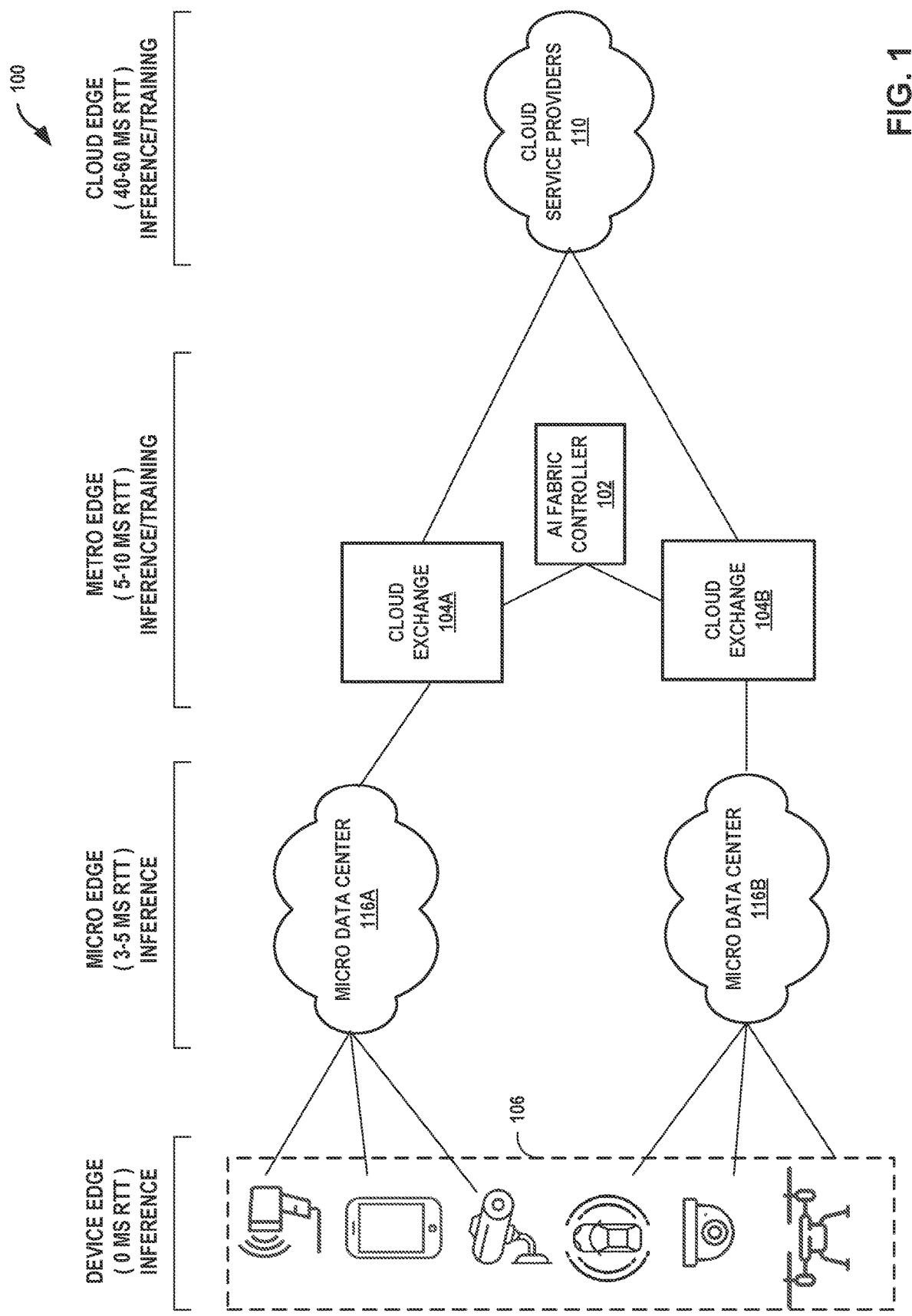
FIG. 1 is a block diagram illustrating a conceptual view of an artificial intelligence system distributed across various edge systems and controlled by an artificial intelligence fabric controller, according to techniques described herein.

FIG. 1 is a block diagram illustrating a conceptual view of an artificial intelligence system 100 distributed across various edge systems and controlled by an artificial intelligence fabric controller 102, according to techniques described herein. In the example illustrated in FIG. 1, various components of system 100 are shown as being part of a cloud edge, metro edge, micro edge, or device edge.

A cloud edge can be where cloud service providers 110 reside and provides a boundary between the cloud service providers 110 and associate cloud clients. Examples of cloud services provided by various cloud service providers 110 include Google Cloud, Azure, Oracle Cloud, Amazon Web Services (AWS), IBM Cloud, Alibaba Cloud, and Salesforce.

A metro edge (also known as a regional hybrid core) can include cloud exchanges 104A and 104B (referred to generically as "cloud exchange 104"). A cloud exchange 104 may provide network and computing infrastructure to provide a way for network participants to exchange traffic in proximity to major population centers. A cloud exchange 104 may provide their customers access to multiple different cloud architectures. Components of a metro edge may typically be found in data centers.

A micro edge (also referred to as a "modular edge") can be where a micro data center (MDC) 116 (also referred to as a modular edge data center (MEDC)) resides. An MDC 116 may be a very small, typically un-staffed facility that allows for highly localized placement of network and computing infrastructure. An MDC 116 can typically provide a small, flexible footprint, interconnection and exchange, along with the ability to support applications that may benefit from relatively short round trip times (RTTs) from when a request for data or action takes place and the time the data is provided, or the action is performed.

The device edge is where devices 106 may provide source data for an AI application. Devices 106 can include cameras, audio devices, sensors, smart phones, drone devices, robotic devices etc. An AI application may be a training application configured to receive source data from devices 106 in the device edge and train a machine learning model such as a neural network. An AI application may be an inferencing application. For example, a trained machine learning models may be deployed for use by inference engines of AI inferencing applications to make inferences from source data from devices 106 in the device edge. For example, such applications may be executed by devices 106.

An AI application may be sensitive to network RTTs. For example, an AI application that performs inferencing may require relatively low RTTs in order to provide rapid response times. In this case, positioning the AI application in a micro edge (typically 3-5 ms RTT) or metro edge (typically 5-10 ms RTT) may be desirable because the RTT is typically less than the RTT when data or algorithms are in the cloud edge (typically 40-60 ms RTT). AI training applications may be less sensitive to RTT and may be positioned at the metro edge or cloud edge.

AI fabric controller 102 can dynamically provision network and compute resources in and among cloud exchanges 104, cloud service providers 110 (public clouds), and micro data centers 116. In some aspects, AI fabric controller 102 can monitor network and compute resource utilization and performance to automatically provision and configure network and compute resources and orchestrate where to provision AI training and inference workloads based on customer requirements and the nature of the AI applications used by the customers (i.e., training vs. inferencing).

In the example illustrated in FIG. 1, artificial intelligence system 100 is shown as being distributed across a cloud edge, metro edge, micro edge and/or device edge. However, artificial intelligence system 100 may be distributed differently than shown in FIG. 1, and the techniques described herein can be readily applied to different organizations and types of edge systems. Further, the number of edge systems in artificial intelligence system 100 may vary from that shown in the example of FIG. 1.

Figure 2:
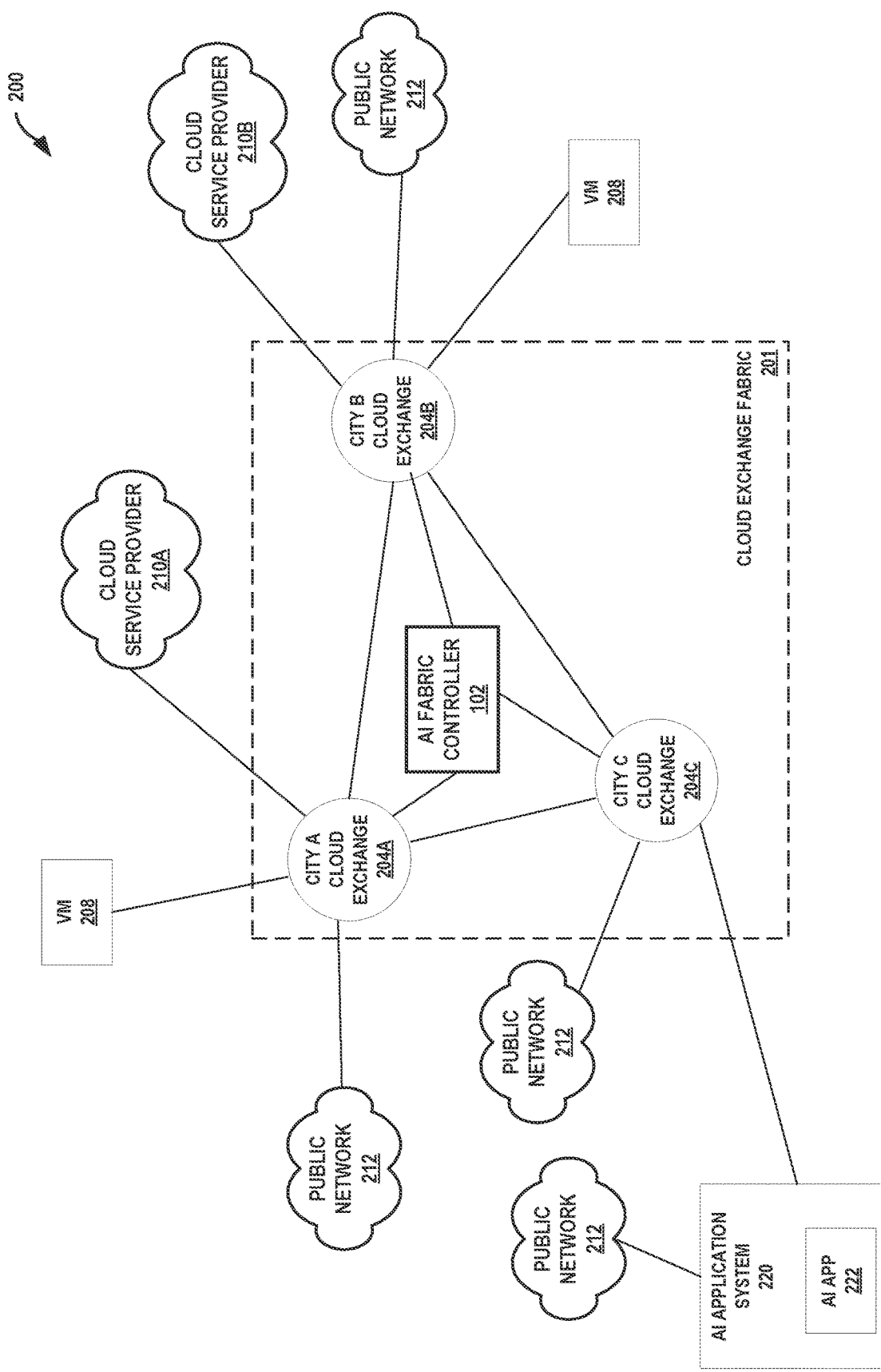
FIG. 2 is a block diagram illustrating an example distributed AI system controlled by an artificial intelligence fabric controller, according to techniques described herein.

FIG. 2 is a block diagram illustrating an example distributed AI system 200 controlled by an AI fabric controller 102, according to techniques described herein. In addition to AI fabric controller 102, AI system 200 can include AI application 220, cloud exchange fabric 201, public networks 212, virtual machines (VMs) 208, and cloud service providers 210A and 210B (collectively "cloud service providers 210"). A public network 212 may be a network that is publicly available with few or no restrictions. For example, public network 212 may be a network that is part of the Internet.

Cloud exchange fabric 201 can include cloud exchanges 204A, 204B and 204C (collectively "cloud exchanges 204"), each in a different location. In the example illustrated in FIG. 2, cloud exchanges 204A, 204B and 204C are located in city A, city B and city C respectively. Cloud exchanges 204 can provide connectivity to public cloud systems or private cloud systems. In some aspects, cloud exchange fabric 201 can be an Equinix Cloud Exchange Fabric provided by Equinix Inc. of Redwood, California.

AI application system 220 can host an AI application 222. An AI application 222 may be an AI training application or an AI inferencing application. AI application 222 may receive data sets for use in training a machine learning model from cloud service providers 210. AI application can also receive data sets from data brokers, private clouds and from IoT devices at the edge. For example, in the case where AI application 222 is a training application, AI application 222 may receive one or more data sets from cloud service provider 210A, and one or more different data sets from cloud service provider 210B. Either or both cloud service provider 210A and 210B provide service via public or private cloud systems. Additionally, AI application 222 can use network and compute resources provided via public network 212, cloud exchange fabric 201, and cloud service providers 210. Cloud service providers 210 may also provide machine learning algorithms used by AI application 222 to train a machine learning model. Further, in the case where AI application is an inferencing application, cloud service providers 210 may provide machine learning models that AI application may use to make inferences based on input data. AI application 222 may utilize compute resources provided by virtual machines (VMs) 208 to train or make inferences. Each of VMs 208 emulates hardware. In other words, each of VMs 208 provides a virtualized operating system and application suite to support training a machine learning model or making inferences based on a machine learning model.

AI fabric controller 102 can analyze the available resources provided within cloud exchange fabric 201, resources available from cloud service providers 210, and VM 208 resources and determine which of the available resources should be used by AI application 222. The determination can be made based on resource costs and/or resource performance.

Figure 3:
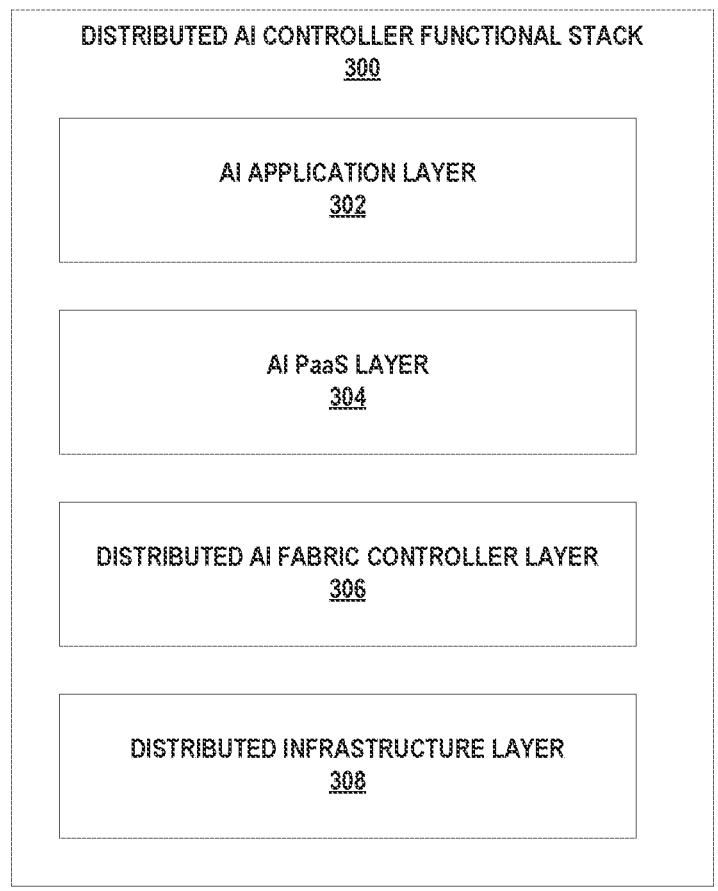
FIG. 3 is a block diagram illustrating a conceptual view of a distributed AI controller functional stack, according to techniques described herein.

FIG. 3 is a block diagram illustrating a conceptual view of a distributed AI controller functional stack 300, according to techniques described herein. In some aspect, AI controller functional stack 300 includes AI application layer 302, AI Platform-as-a-Service (PaaS) layer 304, distributed AI fabric controller layer 306, and distributed infrastructure layer 308. In some aspects, each of the layers can utilize application program interfaces (APIs) to communicate between adjacent layers.

AI application layer 302 includes AI application code and data for the AI application. For example, AI application layer 302 may perform training and/or inference algorithms at different locations.

AI Platform-as-a-Service (PaaS) layer 304 performs AI workflow orchestration. For example, AI PaaS layer 304 can deploy training and inference workflows across multiple locations. In some aspects, the workflows may be implanted as containers (e.g., such as those provided by the open source Docker Container application). In some aspects, orchestration of the workflows may be implanted using Kubeflow. Information regarding Kubeflow is available at the Uniform Resource Locator (URL) "www.kubeflow.org/docs/," which is hereby incorporated by reference herein.

Distributed AI fabric controller layer 306 interfaces with a distributed AI fabric controller that uses the techniques described herein to dynamically monitor resource utilization and AI model accuracy requirements and determines where to provision or move AI training and inference workflows.

Distributed infrastructure layer 308 interfaces with network, data, and computing resources that can span across multiple clouds and data centers. Such resources can include bare metal servers or virtualized computing infrastructure, which may be available for allocation within data centers.

Figure 4:
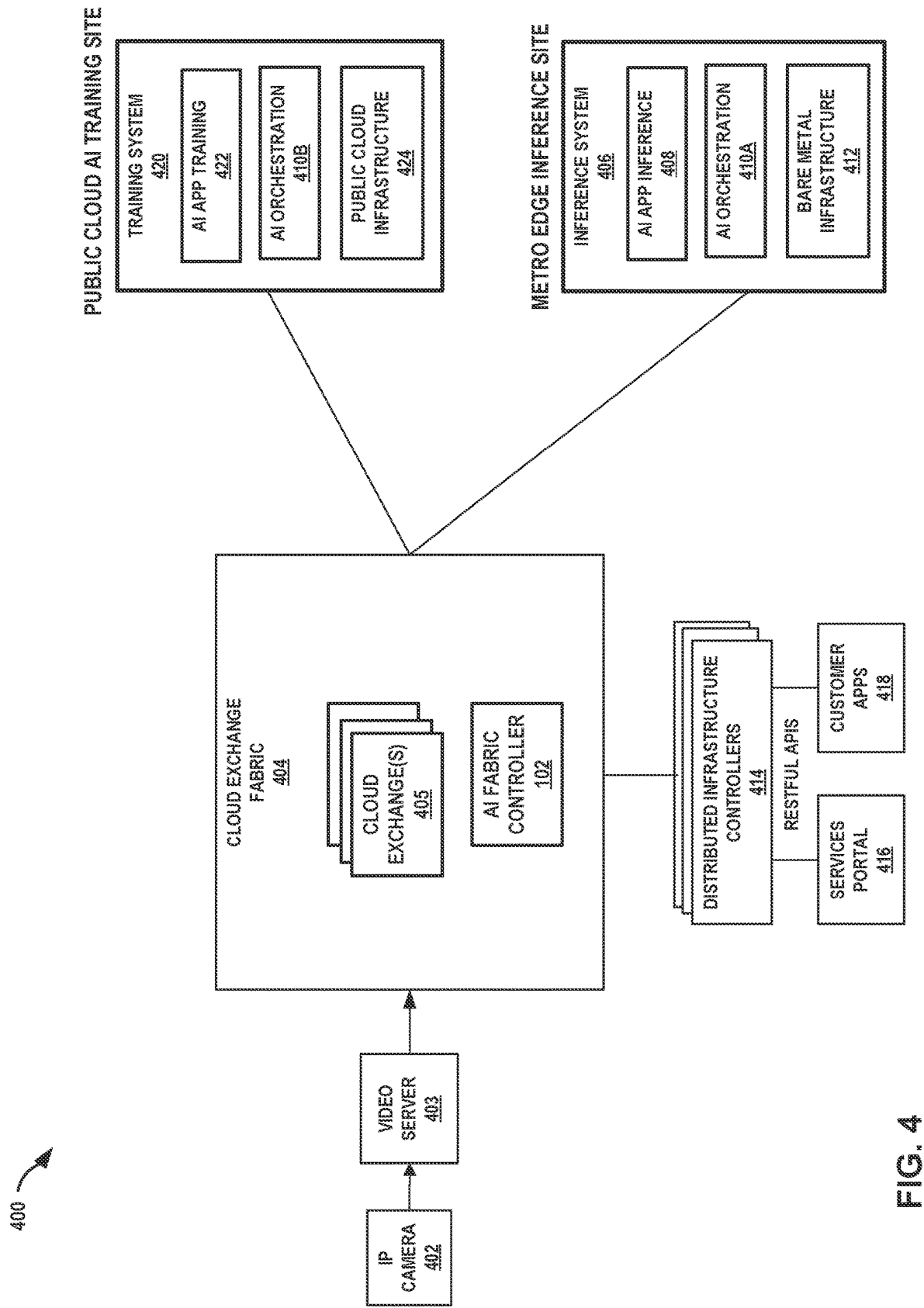
FIG. 4 is a block diagram illustrating a conceptual view of an example distributed AI application and controller architecture for analyzing surveillance data.

FIG. 4 is a block diagram illustrating a conceptual view of an example distributed AI application and controller architecture 400 for analyzing surveillance data. In some aspects, architecture 400 includes an Internet Protocol (IP) camera 402, a video server 403, cloud exchange fabric 404, inference system 406, training system 420, distributed infrastructure controllers 414, services portal 416 and customer applications 418. In the example illustrated in FIG. 4, IP camera 402 provides video data to video server 403, which is communicably coupled to a cloud exchange 405 of cloud exchange fabric 404. The video data may be communicated via cloud exchange fabric 404 to inference system 406 and/or training system 420. AI fabric controller 102 can determine optimal resource allocations depending on the constraints (capacity, availability, cost, performance, privacy etc.) associated with training system 420 and inference system 406.

Training system 420 and inference system 406 include layers corresponding to distributed AI controller functional stack 300 (FIG. 3). For example, training system 420 includes AI application training layer 422 corresponding to AI application layer 302, AI orchestration layer 410B corresponding to AI PaaS layer 304, and public cloud infrastructure layer 424 corresponding to distributed infrastructure layer 308. Public cloud infrastructure layer 424 may interface with public cloud systems to store video data received from IP camera 402 via video server 403 and use the stored data to train a machine learning model that may be used by inference system 406 to provide automated surveillance capability.

Inference system 406 includes AI application inference layer 408 corresponding to AI application layer 302, AI orchestration layer 410A corresponding to AI PaaS layer 304, and bare metal infrastructure layer 412 corresponding to distributed infrastructure layer 308. Bare metal infrastructure layer 412 may interface with bare metal servers that use the machine learning model to detect surveillance issues based on video data received from IP camera 402 via video server 403. Inference system 406 may use bare metal servers in order to achieve lower response times that would be the case if the machine learning model was used by cloud-based processing resources. While illustrated and described as a bare metal infrastructure, distributed infrastructure layer 308 may be implemented in metro edge inference sites using virtualized computing infrastructures, such as container-based or virtual machine-based computing infrastructures.

Distributed infrastructure controllers 414 can provision the underlying compute, storage, and networking infrastructure resources. The service portals 416 can be infrastructure provisioning portals (i.e., can be AI or infrastructure provisioning PaaS layers). In some aspects, customer applications 418 can be middleware applications like Federated Analytics Frameworks (e.g., KubeFATE) and AIOps frameworks (e.g., Kubeflow).

Figure 5:
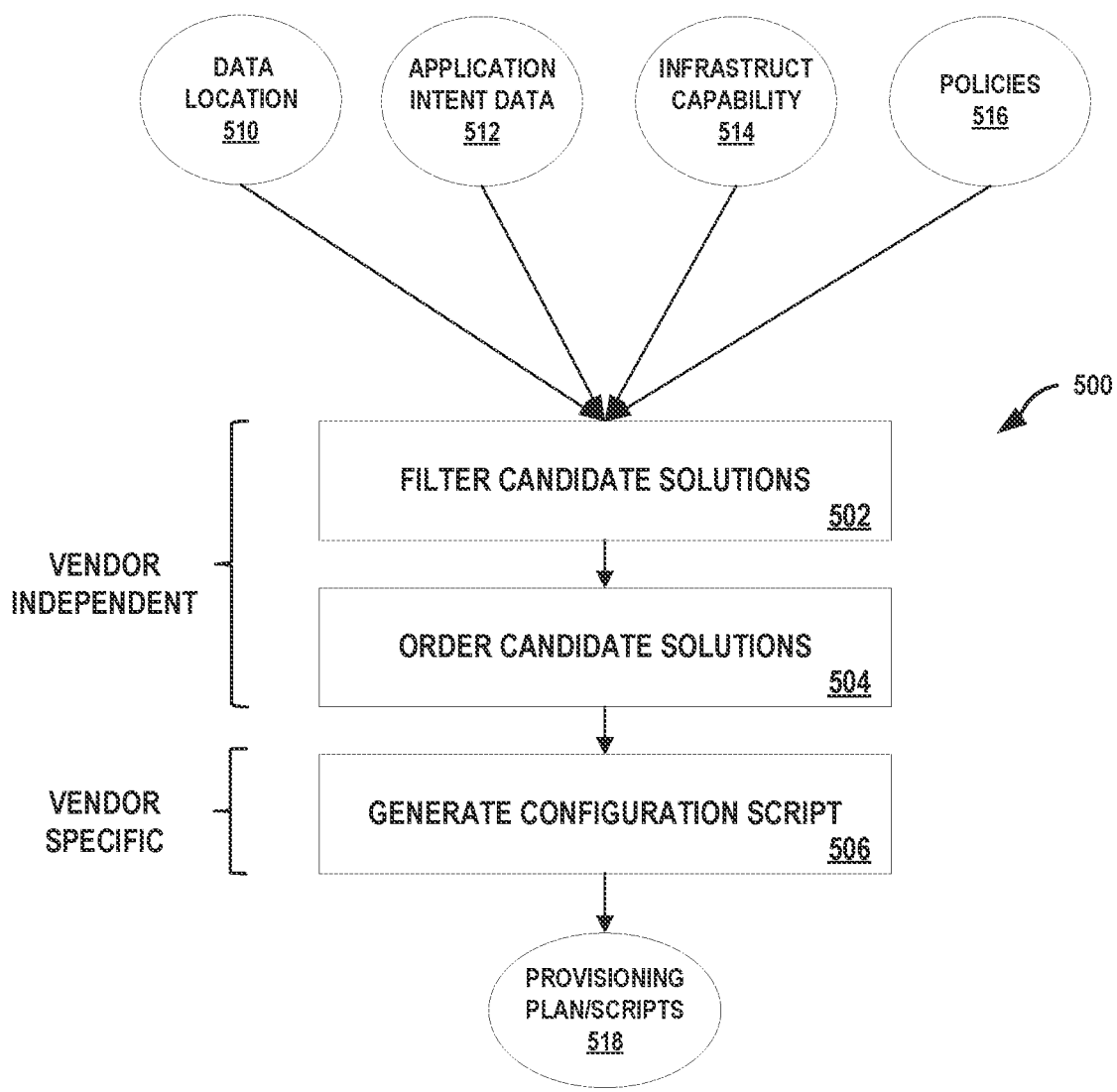
FIG. 5 is a flowchart illustrating operations of a method for generating provisioning plans according to techniques described herein.

FIG. 5 is a flowchart illustrating operations of a method for generating provisioning plans according to techniques described herein. An AI fabric controller can receive one or more of data location 510, application intent data 512, infrastructure capability 514, and policies 516. Data location 510 can specify one or more source data locations for use by an AI application. Examples of data locations include cloud locations, edge locations, private data centers or a data broker location. Application intent data 512 can define parameters for various resources used or requested by the AI application. Examples of such parameters include network bandwidth, network latency upper bound, network packet drop percentage, and network availability percentage. Examples of application intent data 512 for compute and/or storage resources can include number of processor cores, number of graphical processor units (GPUs), bandwidth percentage, amount of memory, type of storage, and storage capacity. Infrastructure capability 514 can be data that describes the currently available network, compute, and data resources available via a cloud exchange fabric. The data can include performance data, availability data, capacity data, security data etc. Policies 516 can be policies that describe a customer's or resource owner's rules and constraints on the use of a resource. The AI fabric controller can filter candidate solutions (e.g., candidate resource allocations and configurations) based on the received data (502).

The AI fabric controller can order the filtered candidate solutions (504). For example, the AI fabric controller can order the filter candidate solutions according to various combinations of resource cost, compliance with business policies, compliance with applicable laws or regulations (e.g., privacy laws), vendor constraints on the use of a resource etc. In some aspects, the ordering may be based on a weighted combination of the factors.

The AI fabric controller can select a candidate solution based on the order and generate scripts that implement the solution (506). For example, the AI fabric controller can generate provisioning scripts and planning scripts 518, that when executed with respect to the resources identified in the candidate solution, implement the selected solution within a distributed infrastructure. The provisioning and planning scripts can utilize existing virtual resources (e.g., Virtual Provide Edges) physical resources (e.g., bare metal servers) and cloud provider APIs. In some aspects, the provisioning and planning scripts may be executed in a batch mode due to the time it may take to execute the scripts and APIs used by the scripts.

In some aspects operations 502 and 504 are vendor and cloud independent. That is, the operations are not necessarily tied to any particular vendor or cloud APIs, data formats, protocols etc. In some aspects, generating provisioning and planning scripts may be vendor specific to account for vendor specific configuration parameters, routines, APIs etc.

Figure 6:
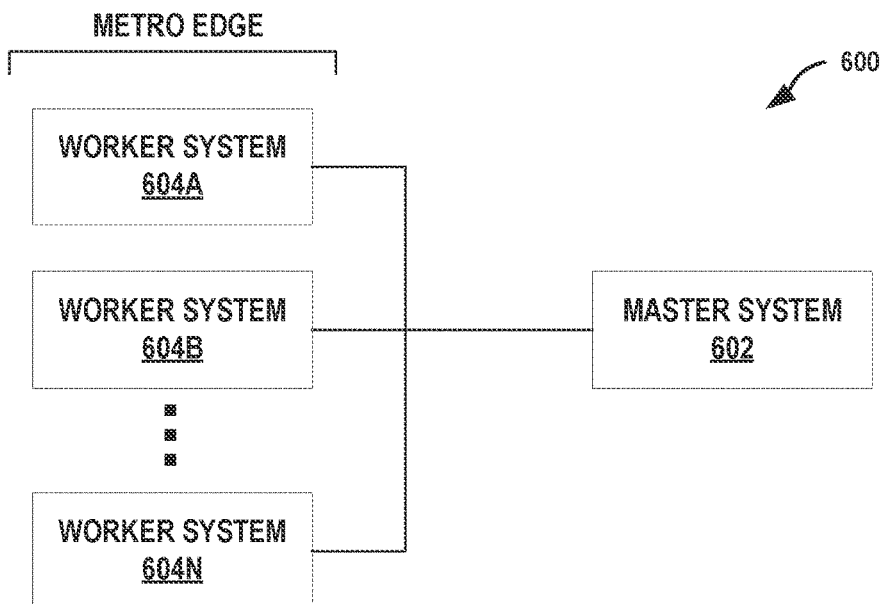
FIG. 6 is a block diagram illustrating a conceptual view of an example of federated learning according to techniques described herein.

FIG. 6 is a block diagram illustrating a conceptual view of an example of federated learning according to techniques described herein. Federated learning is a technique for developing single machine learning model by combining multiple machine learning models that are trained using local data across decentralized Metro edge locations. In the example illustrated in FIG. 6, a master system 602 can send an initial machine learning model and/or machine learning algorithm to a set of worker systems 604A-604N (generically "worker system 604). A worker system 604 trains its version of the machine learning model using local data and shares its locally trained machine learning model with master system 602. Master system 602 aggregates the machine learning model received from each of the worker systems 604A-604N to build a single model that may be referred to as a "global model."

As discussed above, an AI fabric controller can run an AI application using various combinations of application location, data location, and operational parameters to determine performance characteristics of each combination. Table 1 below illustrates example output that shows the measured machine learning model performance of various combination resource locations and operational parameters. In this example, the output can be used to determine whether a centralized or distributed (e.g., federated) training architecture is desirable. Each row in the table shows the locations and configuration parameters used for a candidate solution.

TABLE 1

| Training mode | Privacy | Master | Worker 1 | Worker 2 | No. of rounds | Epochs per round | Mean dice score |
| --- | --- | --- | --- | --- | --- | --- | --- |
| Centralized | OFF | — | LA | — | — | 500 | 0.937 |
| Distributed | OFF | SVC (Ashburn) | LA | LA | 50 | 10 | 0.847 |
| Distributed | OFF | SVC (Ashburn) | LA | Atlanta, GA | 50 | 10 | 0.749 |

TABLE 1-continued

| Training mode | Privacy | Master | Worker 1 | Worker 2 | No. of rounds | Epochs per round | Mean dice score |
|---|---|---|---|---|---|---|---|
| Distributed | ON | SVC (Ashburn) | LA | LA | 50 | 10 | 0.710 |
| Distributed | ON | SVC (Ashburn) | LA | Atlanta, GA | 50 | 10 | 0.765 |

The columns in Table 1 are as follows:

Differential Privacy: Even with model sharing, original data can be compromised by backtracking the model. To solve this problem, privacy mode can be used which allows worker to send only certain amount of model weights to master machine.

Master: Location of master process (in distributed training only).

Worker 1: Location of first worker process in distributed training.

Worker 1: Location of second worker process in distributed training.

Round: Master sends the model to clients and each client trains the model using local data and send it to master. Master aggregates all the models to generate single global model. This entire process is defined as a single round.

Dice Score: Metric to evaluate the performance of the resulting machine learning model (Higher number indicates better accuracy).

Epoch: One complete iteration through the training data

As can be seen from Table 1, a centralized mode of training yields the most accurate machine learning model (as would be expected). However, a distributed mode of training with a master node in Ashburn and worker nodes in Los Angeles may yield acceptable results and may have lower training time and/or resource costs.

Figure 7:
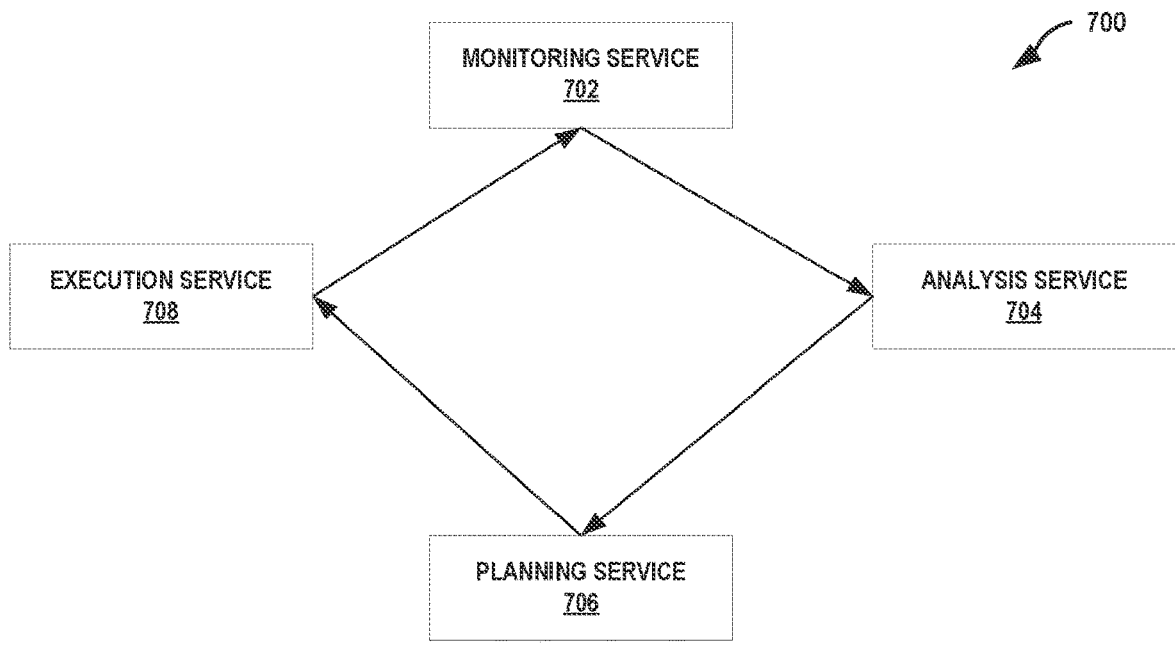
FIG. 7 is a block diagram illustrating a service architecture in a distributed AI fabric controller according to techniques described herein.

FIG. 7 is a block diagram illustrating a service architecture in a distributed AI fabric controller according to techniques described herein. In some implementations, an AI fabric controller 102 can include monitoring service 702, analysis service 704, planning service 706, and execution service 708. In some aspects, one or more of the services may be implemented as micro-services.

Monitoring service 702 can discover unprovisioned resources that become available and can monitor provisioned services for availability, capacity, performance etc. For example, as new resources (e.g., compute, storage, or network resources) become available, monitoring service 702 can add the resource to a graph of AI training and inference nodes. Monitoring service 702 can monitor the resources in the graph for resource utilization, availability, capacity, performance etc.

Analysis service 704 can model various candidate solutions and determine which of the candidate solutions should be deployed into production. The determination may be based on one or more execution metrics of the AI application. The execution metrics can include AI application performance, machine learning model accuracy, infrastructure costs (including data transfer costs), resource usage costs, business logic, business constraints, privacy constraints etc. The analysis service may be triggered to execute in response to a new resource being added to a system or other situations where it is desired to determine an optimal solution from multiple candidate solutions. As an example, analysis service 704 may obtain a set of candidate solutions along with each candidate solution's model accuracy, cost, and privacy settings. Analysis service 704 can filter candidate solutions based on, for example, a model accuracy score of the machine learning model produced by the candidate solutions. For example, candidate solutions having an accuracy score below a threshold may be removed from consideration. The filtered set of candidate solutions may be ordered based, for example, model accuracy of the candidate solution and whether the solution is a federated solution or centralized. The filtered set of candidate solutions may be further ordered based on other criteria, such as differential privacy settings.

Planning service 706 performs provisioning planning for the different candidate solutions. For example, planning service 706 can create Kubeflow AI pipelines based on the candidate solutions. Planning service 706 can perform provisioning planning for both training and inference AI applications. Planning service 706 can be triggered to execute during new provisioning request or when there is a change in cost, performance, data source location or privacy requirements. In some aspects, planning service 706 can determine if the filtered set of candidate solutions can satisfy an application intent. As noted above, application intent can describe attributes of resources used or requested by an AI application. Such attributes include network bandwidth, network latency upper bound, network packet drop percentage, and network availability percentage, number of processor cores, number of GPUs, bandwidth percentage, amount of memory, type of storage, and storage capacity. Planning service 706 can also determine if the AI application can operate in a federated mode. If so, planning service 706 can generate additional candidate training solutions in addition to a centralized training solution. Planning service 706 can order particularized federated or centralized candidate solutions for deployment based on cost (e.g., resource usage costs). Planning service 706 can filter the candidate solutions (before or after ordering) based on business constraints, if any. The set of candidate solutions can be output for deployment by execution service 708.

Execution service 708 provisions the resource plan generated by planning service 706 across the distributed resources of a system. In some aspects, execution service 708 can, for each of the candidate solutions, provision compute nodes (e.g., bare metal servers, virtual machines, cloud-based services etc.) and storage nodes. Execution service 708 can make copies of data and/or identify connections to data sources. In some aspects, execution service 708 can create a Virtual Private Edge (VPE) cloud between compute nodes, storage nodes, and data sources. In some aspects, execution service 708 can provision clusters at the compute nodes and storage nodes, and create an execution environment for the clusters. In some aspects, execution service 708 can include a container orchestration platform (not shown in FIG. 7) that can be used to create the execution environment and schedule resources for the execution environment. A container orchestration platform can be used to deploy, manage, and scale applications that are packaged as "containers." Example instances of container orchestration platforms include Kubernetes, Docker swarm, Mesos/Marathon, OpenShift, OpenStack, Google Cloud Run, and Amazon ECS, among others. The provisioned candidate solutions can be executed to obtain execution metrics that can be used to select an optimal candidate solution for deployment to a production environment. Execution service 708 can also provision the selected candidate solution in the production environment in the same manner as for the candidate solutions.

Figure 8:
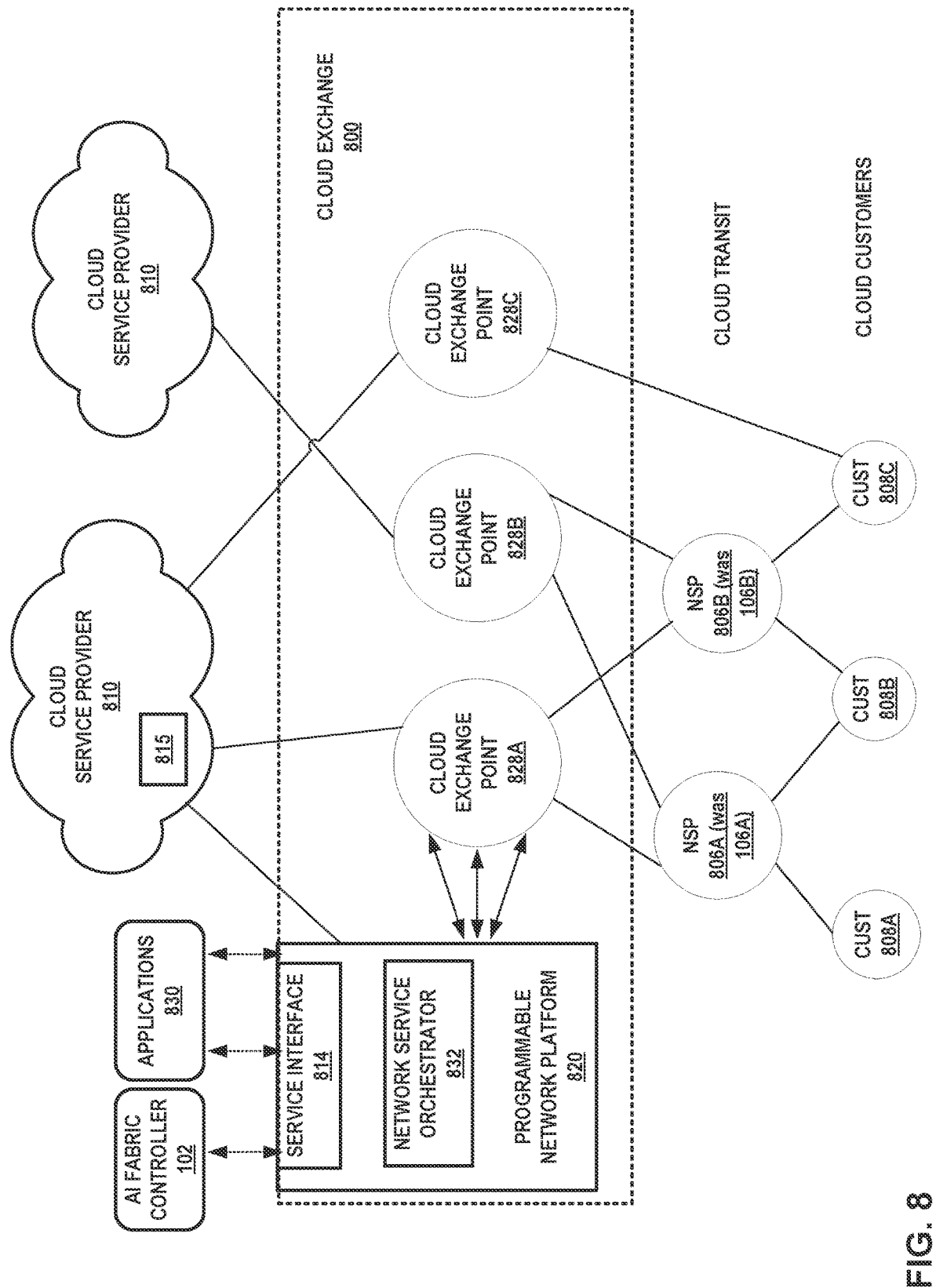
FIG. 8 is a block diagram that illustrates a conceptual view of a network system having a metro-based cloud exchange that provides multiple cloud exchange points according to techniques described herein.

FIG. 8 is a block diagram that illustrates a conceptual view of a network system having a metro-based cloud exchange that provides multiple cloud exchange points according to techniques described herein. The multiple cloud exchange points may be used by distributed AI fabric controller 102 to provide connectivity to resources used in a distributed AI application. Each of cloud-based services exchange points 828A-828C (described hereinafter as "cloud exchange points" and collectively referred to as "cloud exchange points 828") of cloud-based services exchange 800 ("cloud exchange 800") may represent a different data center geographically located within the same metropolitan area ("metro-based," e.g., in New York City, New York; Silicon Valley, California; Seattle-Tacoma, Washington; Minneapolis-St. Paul, Minnesota; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 800 may include more or fewer cloud exchange points 828. In some instances, a cloud exchange 800 includes just one cloud exchange point 828. As used herein, reference to a "cloud exchange" or "cloud-based services exchange" may refer to a cloud exchange point. A cloud exchange provider may deploy instances of cloud exchanges 800 in multiple different metropolitan areas, each instance of cloud exchange 800 having one or more cloud exchange points 828.

Each of cloud exchange points 828 includes network infrastructure and an operating environment by which cloud customers 808A-808C (collectively, "cloud customers 808") receive cloud services from multiple cloud service providers 810A-810N (collectively, "cloud service providers 810"). The cloud service provider 810 may host one of more cloud services 815. As noted above, the cloud service providers 810 may be public or private cloud service providers.

Cloud exchange 800 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 800 allows private networks of any customer to be directly cross-connected to any other customer at a common point, thereby allowing direct exchange of network traffic between the networks of the customers.

Cloud customers 808 may receive cloud-based services directly via a layer 3 peering and physical connection to one of cloud exchange points 828 or indirectly via one of network service providers 806A-806B (collectively, "NSPs 806," or alternatively, "carriers 806"). NSPs 806 provide "cloud transit" by maintaining a physical presence within one or more of cloud exchange points 828 and aggregating layer 3 access from one or customers 808. NSPs 806 may peer, at layer 3, directly with one or more cloud exchange points 828 and in so doing offer indirect layer 3 connectivity and peering to one or more customers 808 by which customers 808 may obtain cloud services from the cloud exchange 800. Each of cloud exchange points 828, in the example of FIG. 8, is assigned a different autonomous system number (ASN). For example, cloud exchange point 828A is assigned ASN 1, cloud exchange point 828B is assigned ASN 2, and so forth. Each cloud exchange point 828 is thus a next hop in a path vector routing protocol (e.g., BGP) path from cloud service providers 810 to customers 808. As a result, each cloud exchange point 828 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 810 to customers. In other words, cloud exchange points 828 may internalize the eBGP peering relationships that cloud service providers 810 and customers 808 would maintain on a pair-wise basis. Instead, a customer 808 may configure a single eBGP peering relationship with a cloud exchange point 828 and receive, via the cloud exchange, multiple cloud services from one or more cloud service providers 810. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 808C is illustrated as having contracted with a cloud exchange provider for cloud exchange 800 to directly access layer 3 cloud services via cloud exchange points 828C. In this way, customer 808C receives redundant layer 3 connectivity to cloud service provider 810A, for instance. Customer 808C, in contrast, is illustrated as having contracted with the cloud exchange provider for cloud exchange 800 to directly access layer 3 cloud services via cloud exchange point 828C and also to have contracted with NSP 806B to access layer 3 cloud services via a transit network of the NSP 806B. Customer 808B is illustrated as having contracted with multiple NSPs 806A, 806B to have redundant cloud access to cloud exchange points 828A, 828B via respective transit networks of the NSPs 806A, 806B. The contracts described above are instantiated in network infrastructure of the cloud exchange points 828 by L3 peering configurations within switching devices of NSPs 806 and cloud exchange points 828 and L3 connections, e.g., layer 3 virtual circuits, established within cloud exchange points 828 to interconnect cloud service provider 810 networks to NSPs 806 networks and customer 808 networks, all having at least one port offering connectivity within one or more of the cloud exchange points 828.

In some examples, cloud exchange 800 allows a corresponding one of customers 808A, 808B of any network service providers (NSPs) or "carriers" 806A-806B (collectively, "carriers 806") or other cloud customers including customers 808C to be directly connected, via a virtual layer 2 (L2) or layer 3 (L3) connection to any other customer network and/or to any of CSPs 810, thereby allowing direct exchange of network traffic among the customer networks and CSPs 810. The virtual L2 or L3 connection may be referred to as a "virtual circuit."

Carriers 806 may each represent a network service provider that is associated with a transit network by which network subscribers of the carrier 806 may access cloud services offered by CSPs 810 via the cloud exchange 800. In general, customers of CSPs 810 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 810 via the cloud exchange 800.

In this way, cloud exchange 800 streamlines and simplifies the process of partnering CSPs 810 and customers (via carriers 806 or directly) in a transparent and neutral manner. One example application of cloud exchange 800 is a co-location and interconnection data center in which CSPs 810 and carriers 806 and/or customers 808 may already have network presence, such as by having one or more accessible ports available for interconnection within the data center, which may represent any of cloud exchange points 828. This allows the participating carriers, customers, and CSPs to have a wide range of interconnectivity options within the same facility. A carrier/customer may in this way have options to create many-to-many interconnections with only a one-time hook up to one or more cloud exchange points 828. In other words, instead of having to establish separate connections across transit networks to access different cloud service providers or different cloud services of one or more cloud service providers, cloud exchange 800 allows customers to interconnect to multiple CSPs and cloud services.

Cloud exchange 800 includes a programmable network platform 820 for dynamically programming cloud exchange 800 to responsively and assuredly fulfill service requests that encapsulate business requirements for services provided by cloud exchange 800 and/or cloud service providers 810 coupled to the cloud exchange 800. Programmable network platform 820 may include a network service orchestrator 832 that handles tenant (e.g., cloud client) requests for resource deployment or AI fabric controller 102 requests for provisioning and deployment. For example, network service orchestrator 832 may organize, direct, and integrate underlying services through VMs 136 (or containers), as well as other software and network sub-systems, for managing various services (e.g., deployment of resources). The programmable network platform 820 may, as a result, orchestrate a business-level service across heterogeneous cloud service providers 810 according to well-defined service policies, quality of service policies, service level agreements, and costs, and further according to a service topology for the business-level service.

The programmable network platform 820 enables the cloud service provider that administers the cloud exchange 800 to dynamically configure and manage the cloud exchange 800 to, for instance, facilitate virtual connections for cloud-based services delivery from multiple cloud service providers 810 to one or more cloud customers 808. The cloud exchange 800 may enable cloud customers 808 to bypass the public Internet to directly connect to cloud services providers 810 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 820 enables the cloud service provider to configure cloud exchange 800 with a L3 instance requested by a cloud customer 808, as described herein. A customer 808 may request an L3 instance to link multiple cloud service providers by the L3 instance, for example (e.g., for transferring the customer's data between two cloud service providers, or for obtaining a mesh of services from multiple cloud service providers).

Programmable network platform 820 may represent an application executing within one or more data centers of the cloud exchange 800 or alternatively, off-site at a back office or branch of the cloud provider (for instance). Programmable network platform 820 may be distributed in whole or in part among the data centers, each data center associated with a different cloud exchange point 828 to make up the cloud exchange 800. Although shown as administering a single cloud exchange 800, programmable network platform 820 may control service provisioning for multiple different cloud exchanges. Alternatively or additionally, multiple separate instances of the programmable network platform 820 may control service provisioning for respective multiple different cloud exchanges.

In the illustrated example, programmable network platform 820 includes a service interface (or "service API") 814 that defines the methods, fields, and/or other software primitives by which applications 830, such as a customer portal, may invoke the programmable network platform 820. The service interface 814 may allow carriers 806, customers 808, cloud service providers 810, and/or the cloud exchange provider programmable access to capabilities and assets of the cloud exchange 800 according to techniques described herein.

For example, the service interface 814 may facilitate machine-to-machine communication to enable dynamic provisioning of virtual circuits in the cloud exchange for interconnecting customer and/or cloud service provider networks. In this way, the programmable network platform 820 enables the automation of aspects of cloud services provisioning. For example, the service interface 814 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 9:
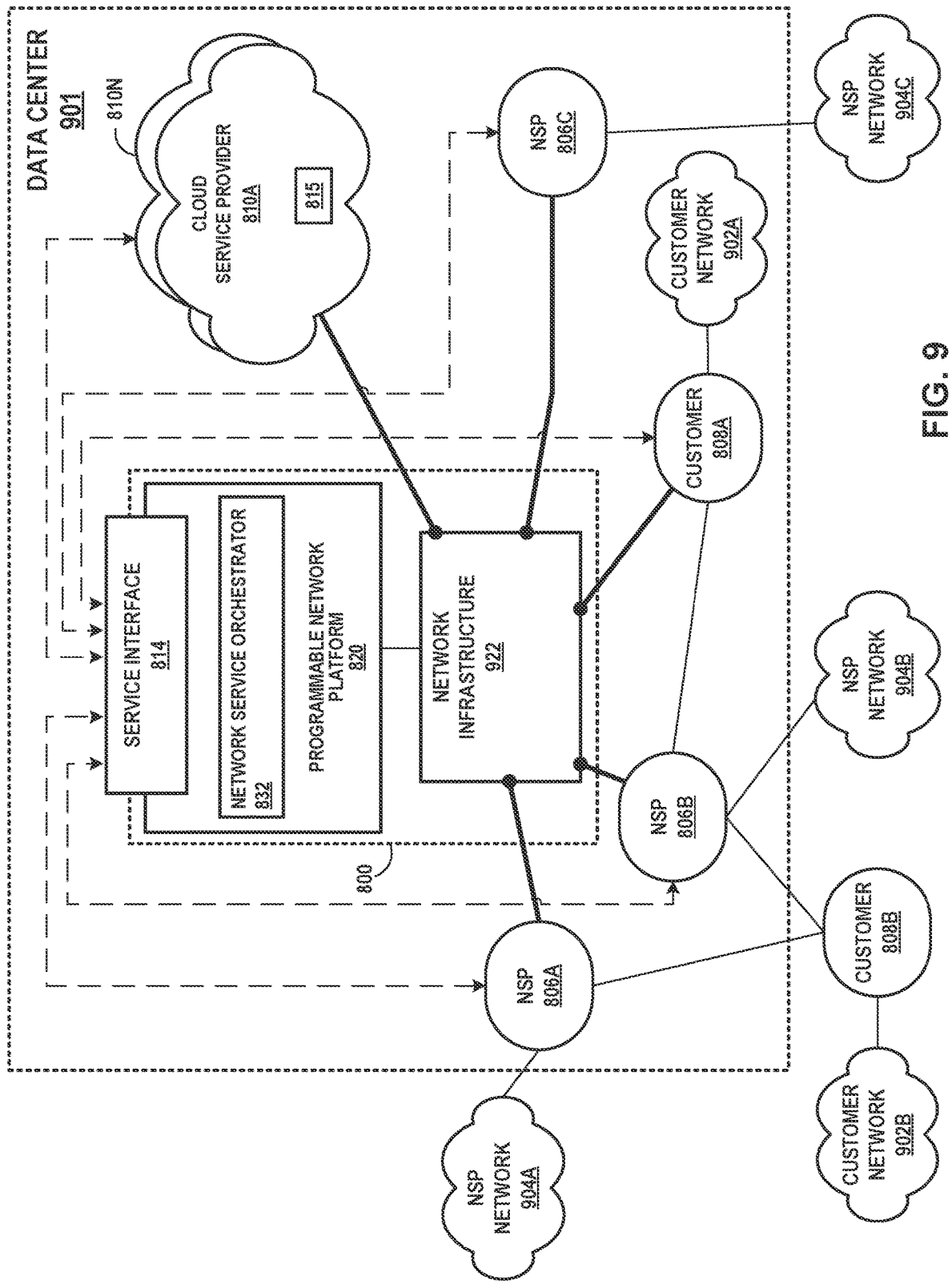
FIG. 9 is a block diagram illustrating an example data center that provides an operating environment a distributed AI fabric controller, according to techniques described herein.

FIG. 9 is a block diagram illustrating an example data center 901 that provides an operating environment a distributed AI fabric controller, according to techniques described herein. In this example data center 901, cloud exchange 800 allows a corresponding one of customer networks 902A, 902B and NSP networks 904A-404C (collectively, "'NSP or 'carrier' networks 904") of any NSPs 806A-806C or other customers to be directly cross-connected, via a layer 2 (L2) or layer 3 (L3) connection to any other customer network, thereby allowing exchange of service traffic among the customer networks and CSPs 810. Data center 901 may be entirely located within a centralized area, such as a warehouse or localized data center complex, and provide power, cabling, security, and other services to NSPs, customers, and cloud service providers that locate their respective networks within the data center 901 (e.g., for colocation) and/or connect to the data center 901 by one or more external links.

Cloud exchange 800 includes network infrastructure 922 and an operating environment by which customer networks 902 may receive services from one or more CSPs 810 via interconnections. In the example of FIG. 9, network infrastructure 922 represents the switching fabric of an interconnection facility of cloud exchange 800 and includes multiple ports that may be dynamically interconnected with virtual circuits by, e.g., invoking service interface 814 of the programmable network platform 820. Each of the ports is associated with NSPs 806, customers 808, and CSPs 810. This enables an NSP customer to have options to create many-to-many interconnections with only a one-time hook up to the switching network and underlying network infrastructure 922 that presents an interconnection platform for cloud exchange 800. In other words, instead of having to establish separate connections across transit networks to access different CSPs 810, cloud exchange 800 allows a customer to interconnect to multiple CSPs 810 using network infrastructure 922 within data center 901.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 922, and a cloud exchange in which customer routers peer with network infrastructure 922 (or "provider") network devices rather than directly with other customers. Cloud exchange 800 may provide, to customers, interconnection services to network services provided by CSPs 810. That is, an interconnection service by cloud exchange 800 provides access to a network service provided by CSPs 810.

For interconnections at layer 3 or above, customers 808 may receive services directly via a layer 3 peering and physical connection to one of colocation facility exchange points or indirectly via one of NSPs 806. NSPs 806 provide "transit" by maintaining a physical presence within data center 901 and aggregating layer 3 access from one or more customers 808. NSPs 806 may peer, at layer 3, directly with data center 901 and in so doing offer indirect layer 3 connectivity and peering to one or more customers 808 by which customers 808 may obtain services from the cloud exchange 800.

In instances in which cloud exchange 800 offers an internet exchange, network infrastructure 922 may be assigned a different autonomous system number (ASN). Network infrastructure 922 is thus a next hop in a path vector routing protocol (e.g., BGP) path from CSPs 810 to customers 808 and/or NSPs 806. As a result, cloud exchange 800 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 810 to customers 808. In other words, cloud exchange 800 may internalize the eBGP peering relationships that CSPs 810 and customers 808 would maintain on a pair-wise basis. Instead, a customer 808 may configure a single eBGP peering relationship with cloud exchange 800 and receive, via the cloud exchange, multiple services from one or more CSPs 810. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 902B in FIG. 9 is illustrated as having contracted with the cloud exchange provider for cloud exchange 800 to directly access layer 3 services via cloud exchange 800 and also to have contracted with NSP 806B to access layer 3 services via a transit network of NSP 806B. Customer network 902A is illustrated as having contracted with NSP 806B to access layer 3 services via a transit network of NSP 806B. The contracts described above may be instantiated in network infrastructure 922 of the cloud exchange 800 by L3 peering configurations within switching devices of NSPs 806 and cloud exchange 800 and L3 connections, e.g., layer 3 virtual circuits, established within cloud exchange 800 to interconnect CSPs 810 to NSPs 806 and customer networks 902, all having at least one port offering connectivity within cloud exchange 800.

Figure 10:
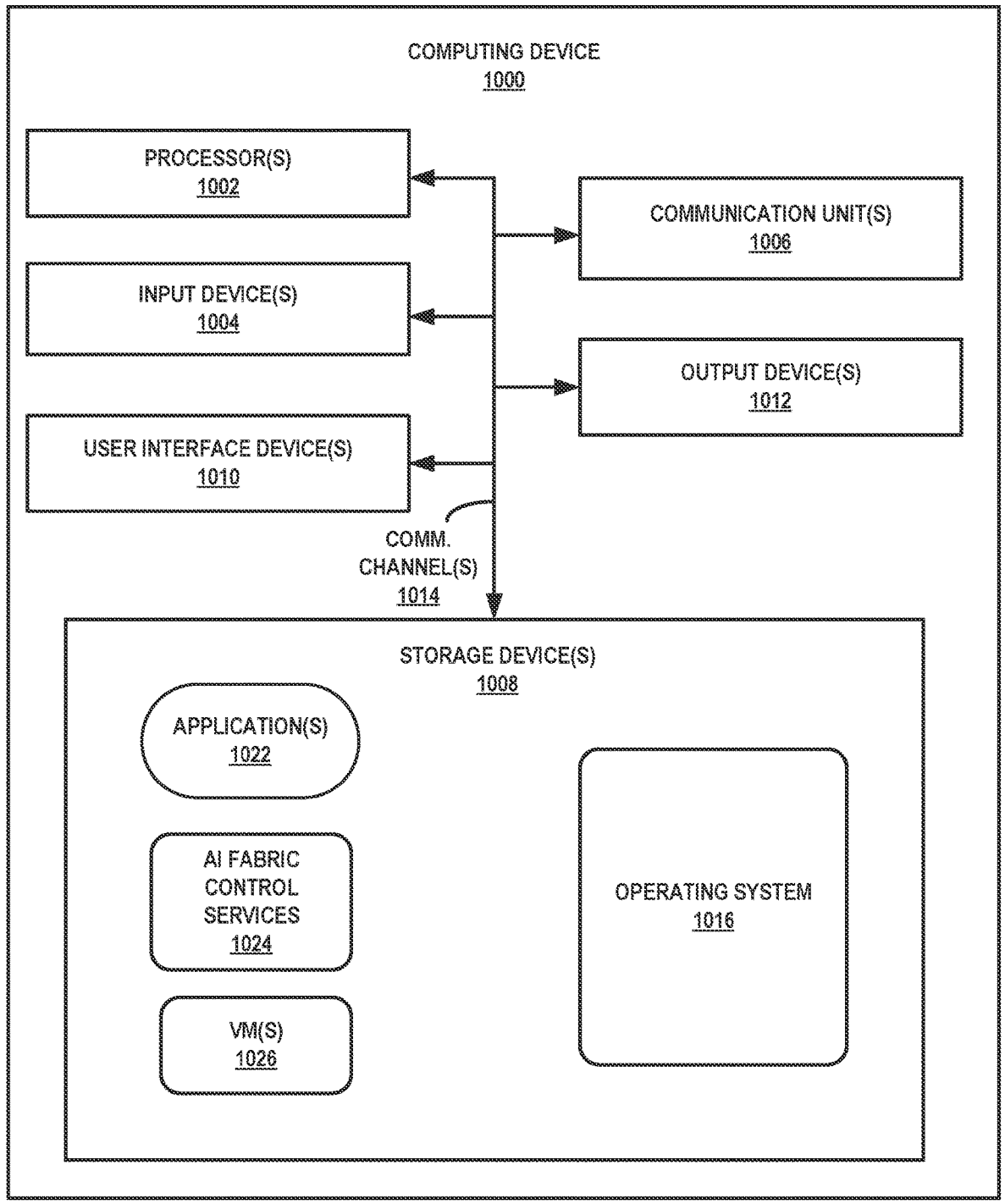
FIG. 10 is a block diagram illustrating further details of one example of a computing device that operates in accordance with one or more techniques of the present disclosure.

FIG. 10 is a block diagram illustrating further details of one example of a computing device that operates in accordance with one or more techniques of the present disclosure. FIG. 10 may illustrate a particular example of a server or other computing device 1000 that includes one or more processor(s) 1002 for executing any one or more of any system, application, or module described herein. For example, the one or more processor(s) 1002 may execute VMs 1026 and AI fabric control services 1024. Other examples of computing device 1000 may be used in other instances. Although shown in FIG. 10 as a stand-alone computing device 1000 for purposes of example, a computing device may be any component or system that includes one or more processors or other suitable computing environment for executing software instructions and, for example, need not necessarily include one or more elements shown in FIG. 10 (e.g., communication units 1006; and in some examples components such as storage device(s) 1008 may not be co-located or in the same chassis as other components).

As shown in the specific example of FIG. 10, computing device 1000 includes one or more processors 1002, one or more input devices 1004, one or more communication units 1006, one or more output devices 1012, one or more storage devices 1008, and user interface (UI) device 1010, and communication unit 1006. Computing device 1000, in one example, further includes one or more applications 1022, AI fabric control services 1024, VMs 1026 and operating system 1016 that are executable by computing device 1000. Each of components 1002, 1004, 1006, 1008, 1010, and 1012 are coupled (physically, communicatively, and/or operatively) for inter-component communications. In some examples, communication channels 1014 may include a system bus, a network connection, an inter-process communication data structure, or any other method for communicating data. As one example, components 1002, 1004, 1006, 1008, 1010, and 1012 may be coupled by one or more communication channels 1014.

Processors 1002, in one example, are configured to implement functionality and/or process instructions for execution within computing device 1000. For example, processors 1002 may be capable of processing instructions stored in storage device 1008. Examples of processors 1002 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1008 may be configured to store information within computing device 1000 during operation. Storage device 1008, in some examples, is described as a computer-readable storage medium. In some examples, storage device 1008 is a temporary memory, meaning that a primary purpose of storage device 1008 is not long-term storage. Storage device 1008, in some examples, is described as a volatile memory, meaning that storage device 1008 does not maintain stored contents when the computer is turned off. Examples of volatile memories include random access memories (RAM), dynamic random access memories (DRAM), static random access memories (SRAM), and other forms of volatile memories known in the art. In some examples, storage device 1008 is used to store program instructions for execution by processors 1002. Storage device 1008, in one example, is used by software or applications running on computing device 1000 to temporarily store information during program execution.

Storage devices 1008, in some examples, also include one or more computer-readable storage media. Storage devices 1008 may be configured to store larger amounts of information than volatile memory. Storage devices 1008 may further be configured for long-term storage of information. In some examples, storage devices 1008 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication units 1006. Computing device 1000, in one example, utilizes communication units 1006 to communicate with external devices via one or more networks, such as one or more wired/wireless/mobile networks. Communication units 1006 may include a network interface card, such as an Ethernet card, an optical transceiver, a radio frequency transceiver, or any other type of device that can send and receive information. In some examples, computing device 1000 uses communication unit 1006 to communicate with an external device.

Computing device 1000, in one example, also includes one or more user interface devices 1010. User interface devices 1010, in some examples, are configured to receive input from a user through tactile, audio, or video feedback. Examples of user interface devices(s) 1010 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 1012 may also be included in computing device 1000. Output device 1012, in some examples, is configured to provide output to a user using tactile, audio, or video stimuli. Output device 1012, in one example, includes a presence-sensitive display, a sound card, a video graphics adapter card, or any other type of device for converting a signal into an appropriate form understandable to humans or machines. Additional examples of output device 1012 include a speaker, a cathode ray tube (CRT) monitor, a liquid crystal display (LCD), or any other type of device that can generate intelligible output to a user.

Computing device 1000 may include operating system 1016. Operating system 1016, in some examples, controls the operation of components of computing device 1000. For example, operating system 1016, in one example, facilitates the communication of one or more applications 1022, VMs 1026 and AI fabric control services 1024 with processors 1002, communication unit 1006, storage device 1008, input device 1004, user interface devices 1010, and output device 1012.

Application 1022, VMs 1026 and AI fabric control services 1024 may also include program instructions and/or data that are executable by computing device 1000.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A computing device comprising:
processing circuitry coupled to a memory;
an artificial intelligence (AI) fabric controller configured for execution by the processing circuitry, wherein the AI fabric controller comprises:

a monitoring service configured to discover available resources communicatively coupled to a cloud exchange and to monitor the available resources;

an analysis service configured to:
obtain a set of candidate solutions, each candidate solution of the set of candidate solutions comprising an AI application and a configuration of resources for use by the AI application, wherein the configuration of resources is different for each of the candidate solutions, and wherein each of the candidate solutions is associated with corresponding execution metrics, and filter, based on one or more of the corresponding execution metrics, the set of candidate solutions to generate a filtered set of candidate solutions, the filtered set of candidate solutions comprising a plurality of candidate solutions;

a planning service configured to generate provisioning scripts for the filtered set of candidate solutions; and an execution service configured to:
execute the provisioning scripts to provision resources for each candidate solution in the filtered set of candidate solutions; and
create an execution environment for each candidate solution in the filtered set of candidate solutions.

2. The computing device of claim 1, wherein the AI fabric controller is configured to determine the corresponding execution metrics associated with a corresponding candidate solution by executing an instance of the AI application for the corresponding candidate solution of the candidate solutions in accordance with the configuration of resources associated with the corresponding candidate solution.

3. The computing device of claim 1, wherein the AI fabric controller is configured to select, from the filtered set of candidate solutions, an optimal candidate solution based on the execution metrics associated with each of the candidate solutions and to deploy the optimal candidate solution to a production environment.

4. The computing device of claim 1, wherein the monitoring service adds resource data describing an available resource as a node to a graph of available resources and monitors the available resources associated with the nodes in the graph.

5. The computing device of claim 1, wherein the monitoring service monitors one or more of resource utilization, resource availability, resource capacity and resource performance for each corresponding available resource of the available resources.

6. The computing device of claim 1, wherein the analysis service is triggered to execute in response to a new resource being added as an available resource.

7. The computing device of claim 1, wherein the execution metrics associated with a corresponding solution comprise one or more of a machine learning model accuracy, a resource cost, and a privacy setting.

8. The computing device of claim 1, wherein the analysis service orders the set of candidate solutions according to an infrastructure cost associated with each respective candidate solution of the set of candidate solutions.

9. The computing device of claim 1, wherein a candidate solution comprises the AI application configured to operate in a centralized mode, and wherein the planning service is configured to:
determine that the AI application can execute in a federated mode;
in response to the determination that the AI application can execute in a federated mode, generating an additional candidate solution corresponding to operating the AI application in the federated mode; and
adding the additional candidate solution to the set of candidate solutions.

10. The computing device of claim 1, wherein to create the execution environment for each candidate solution comprises to create the execution environment using a container orchestration platform.

11. A method comprising:
discovering, by one or more processors, available resources communicatively coupled to a cloud exchange;
obtaining, by the one or more processors, a set of candidate solutions, each candidate solution of the set of candidate solutions comprising an artificial intelligence (AI) application and a configuration of resources for use by the AI application, wherein the configuration of resources is different for each of the candidate solutions, and wherein each of the candidate solutions is associated with corresponding execution metrics, and
filtering, by the one or more processors, based on one or more of the corresponding execution metrics, the set of candidate solutions to generate a filtered set of candidate solutions, the filtered set of candidate solutions comprising a plurality of candidate solutions;
generating, by the one or more processors, provisioning scripts for the filtered set of candidate solutions;
executing, by the one or more processors, the provisioning scripts to provision resources for each candidate solution in the filtered set of candidate solutions; and
creating an execution environment for each candidate solution in the filtered set of candidate solutions.

12. The method of claim 11, further comprising executing an instance of the AI application for a corresponding candidate solution of the candidate solutions in accordance with the configuration of resources associated with the corresponding candidate solution to determine the corresponding execution metrics associated with the corresponding candidate solution.

13. The method of claim 11, further comprising:
selecting, from the filtered set of candidate solutions, an optimal candidate solution based on the execution metrics associated with each of the filtered set of candidate solutions; and
deploying the optimal candidate solution to a production environment.

14. The method of claim 11, further comprising adding resource data describing an available resource as a node to a graph of available resources; and
monitoring the available resources associated with the nodes in the graph.

15. The method of claim 14, wherein monitoring the available resources comprises monitoring one or more of resource utilization, resource availability, resource capacity and resource performance for each corresponding available resource of the available resources.

16. The method of claim 11, wherein the execution metrics associated with a corresponding solution comprise one or more of a machine learning model accuracy, a resource cost, and a privacy setting.

17. The method of claim 11, further comprising ordering the set of candidate solutions according to an infrastructure cost associated with each respective candidate solution of the set of candidate solutions.

18. The method of claim 11, wherein a candidate solution comprises the AI application configured to operate in a centralized mode, and wherein the method further comprises:
  determining that the AI application can execute in a federated mode;
  in response to determining that the AI application can execute in a federated mode, generating an additional candidate solution corresponding to operating the AI application in the federated mode; and
  adding the additional candidate solution to the set of candidate solutions.

19. The method of claim 11, wherein creating the execution environment for each candidate solution comprises creating the execution environment using a container orchestration platform.

20. A non-transitory computer readable medium comprising instructions that, when executed by one or more processors, cause the one or more processors to:
  discover available resources communicatively coupled to a cloud exchange;
  obtain a set of candidate solutions, each candidate solution of the set of candidate solutions comprising an AI application and a configuration of resources for use by the AI application, wherein the configuration of resources is different for each of the candidate solutions, and wherein each of the candidate solutions is associated with corresponding execution metrics, and
  filter, based on one or more of the corresponding execution metrics, the set of candidate solutions to generate a filtered set of candidate solutions, the filtered set of candidate solutions comprising a plurality of candidate solutions;
  generate provisioning scripts for the filtered set of candidate solutions;
  execute the provisioning scripts to provision resources for each candidate solution in the filtered set of candidate solutions; and
  create an execution environment for each candidate solution in the filtered set of candidate solutions.

* * * * *